UNITED STATES PATENT OFFICE.

CHRISTOPH RIS-KUMMER, OF BASLE, SWITZERLAND.

PROCESS OF TREATING RAW SILK.

SPECIFICATION forming part of Letters Patent No. 549,257, dated November 5, 1895.

Application filed August 26, 1895. Serial No. 560,581. (No specimens.)

*To all whom it may concern:*

Be it known that I, CHRISTOPH RIS-KUMMER, a citizen of the Swiss Republic, residing at Basle, Switzerland, have invented a new and useful Improvement in Raw Silk; and I do hereby declare that the following is a full, clear, and exact description of the invention, which will enable others skilled in the art to which it appertains to make and use the same.

This invention relates to an improvement in raw silk, which, as is known, consists of fibroin that is covered with a silk bast or coating of sericin, which is an albumen-like coating soluble in warm water.

According to my invention the raw silk is treated with an aldehyde of the fatty series, preferably formaldehyde, either in gaseous form or in solution, whereby the sericin or silk bast is rendered insoluble in hot water, so that the raw silk thus treated is rendered more resisting and can be treated with hot liquids, whereby the dyeing of the raw silk is facilitated.

For carrying out the said process I proceed as follows: The raw silk in the form of threads, or in a woven, knitted, platted, &c., condition, is placed in a formaldehyde solution of one-fourth or one-half per cent. and is allowed to remain for about three hours at ordinary temperature. The raw silk, the sericin coating of which has become insoluble by the action of the formaldehyde, is then rinsed with water and dried. If necessary, any remaining traces of formaldehyde can be converted into hexamethylentetramine by heating the raw silk with ammonia in order to remove the smell of formaldehyde. The sericin coating of the raw silk thus treated is quite insoluble both in neutral or acid liquids and in soap baths and dilute alkaline baths, so that, whether in the form of threads or as woven or other fabrics, it can be treated with hot liquids, thus greatly facilitating the dyeing of raw silk. Furthermore, the raw silk thus treated is much stronger than ordinary raw silk, which is a great advantage in certain applications.

In addition to the above advantages, the silk fiber, strengthened as above described, shrinks much less when treated with hot liquids, and it offers a modified affinity to dye-stuffs as compared with ordinary silk freed from its sericin coating, as also with the ordinary raw silk.

Having now particularly described and ascertained the nature of this invention and in what manner the same is to be performed, I declare that what I claim is—

1. A process for improving raw silk consisting in treating the same with an aldehyde of the fatty series, such as formaldehyde, for the purpose of rendering the sericin coating of the raw silk fiber insoluble, substantially as described.

2. As a new article of manufacture, raw silk having an insoluble sericin coating, substantially as described.

In witness whereof I have hereunto signed my name in the presence of two subscribing witnesses.

CHRISTOPH RIS-KUMMER.

Witnesses:
GEORGE GIFFORD,
AMAND RITTEY.